United States Patent
Huang

(10) Patent No.: US 7,261,411 B1
(45) Date of Patent: Aug. 28, 2007

(54) EYEGLASSES STRUCTURE

(76) Inventor: Chih-Chang Huang, No. 36, Shaluen, Jungsha Tsuen, Anding Shiang, Tainan County (TW)

( * ) Notice: Subject to any disclaimer, the term of this patent is extended or adjusted under 35 U.S.C. 154(b) by 0 days.

(21) Appl. No.: 11/417,103

(22) Filed: May 4, 2006

(51) Int. Cl.
  *G02C 5/22* (2006.01)
(52) U.S. Cl. .......................................... 351/153; 16/228
(58) Field of Classification Search ................ 351/153, 351/113, 111, 140, 41, 158; 16/228
  See application file for complete search history.

(56) References Cited

U.S. PATENT DOCUMENTS 5,187,504 A * 2/1993 Kanda .......................... 351/153
5,739,891 A * 4/1998 Wei ............................... 351/113
6,814,438 B2 * 11/2004 Desbiez-Piat ................ 351/153
2006/0179609 A1 * 8/2006 Huang ........................... 16/228

* cited by examiner

*Primary Examiner*—Hung Xuan Dang
(74) *Attorney, Agent, or Firm*—Rosenberg, Klein & Lee

(57) ABSTRACT

A pair of eyeglasses include two rims, and two temples; each rim has a cavity, a spring held in the cavity, and a holding element positioned partially in the cavity to cover the spring and having a pressing portion; each temple has a protruding portion, which has a locating concavity, and a position holding portion; the temples are pivoted to the rims with the holding elements being pressed against the protruding portions at the pressing portions; the temples will be held in position with the holding elements being pressed against the locating concavities when they are in the in-use position; the temples will be held in position with the holding elements being pressed against the position holding portions when they are in the not-in-use position; the holding elements will snap onto the locating concavities in a perceptible manner as soon as the temples are pivoted to the in-use position.

1 Claim, 5 Drawing Sheets

EYEGLASSES STRUCTURE

BACKGROUND OF THE INVENTION

1. Field of the Invention

The present invention relates to an improvement on eyeglasses, more particularly one, which have spring-biased elements capable of snapping onto front protruding portions of the temples and holding the temples in position when the temples are pivoted to the not-in-use position, and when the temples are pivoted to the in-use position.

2. Brief Description of the Prior Art

Spring-biased temples of eyeglasses are available, which make the eyeglasses more comfortable to wear. A conventional eyeglasses temple includes a supporting part, a sleeve, a spring, and a confining block, and it has the following disadvantages: The spring is prone to pinch and hurt the wearer's skin. There is no position maintaining means for holding the temples in position after the eyeglasses are moved to their in-use position and folded one. Consequently, the temples are prone to shake, and will occupy more space when the eyeglasses aren't in use.

SUMMARY OF THE INVENTION

It is a main object of the invention to provide an improvement on eyeglasses structure to overcome the above-mentioned problems. The eyeglasses of the present invention include two rims, and two temples; each rim has a cavity, a spring held in the cavity, a holding element, which is positioned partially in the cavity so as to be around and cover the spring, and has a pressing portion; each temple has a protruding portion, which has a locating concavity, and a position holding portion. The temples are pivoted to the rims with the holding elements being pressed against the protruding portions of the temples at the pressing portions. The temples will be held in position with the holding elements being pressed against the locating concavities when they are in the in-use position. The temples will be held in position with the holding elements being pressed against the position holding portions when they are in the not-in-use position. The holding elements will snap onto the locating concavities in an easily perceptible manner as soon as the temples are pivoted to the in-use position. The holding elements will snap onto the position holding portions of the temples in an easily perceptible manner as soon as the temples are pivoted to the not-in-use position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
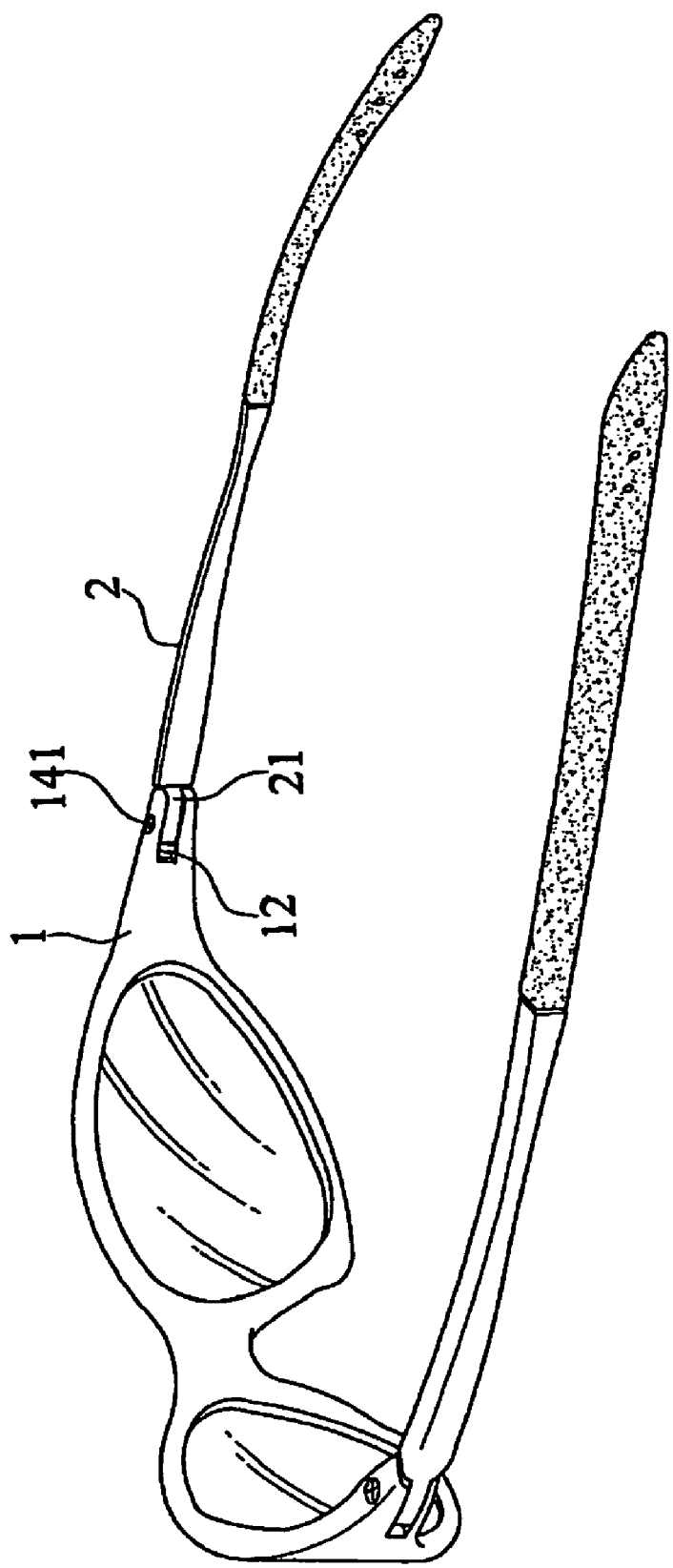
FIG. 1 is a perspective view of the present invention.
Figure 2:
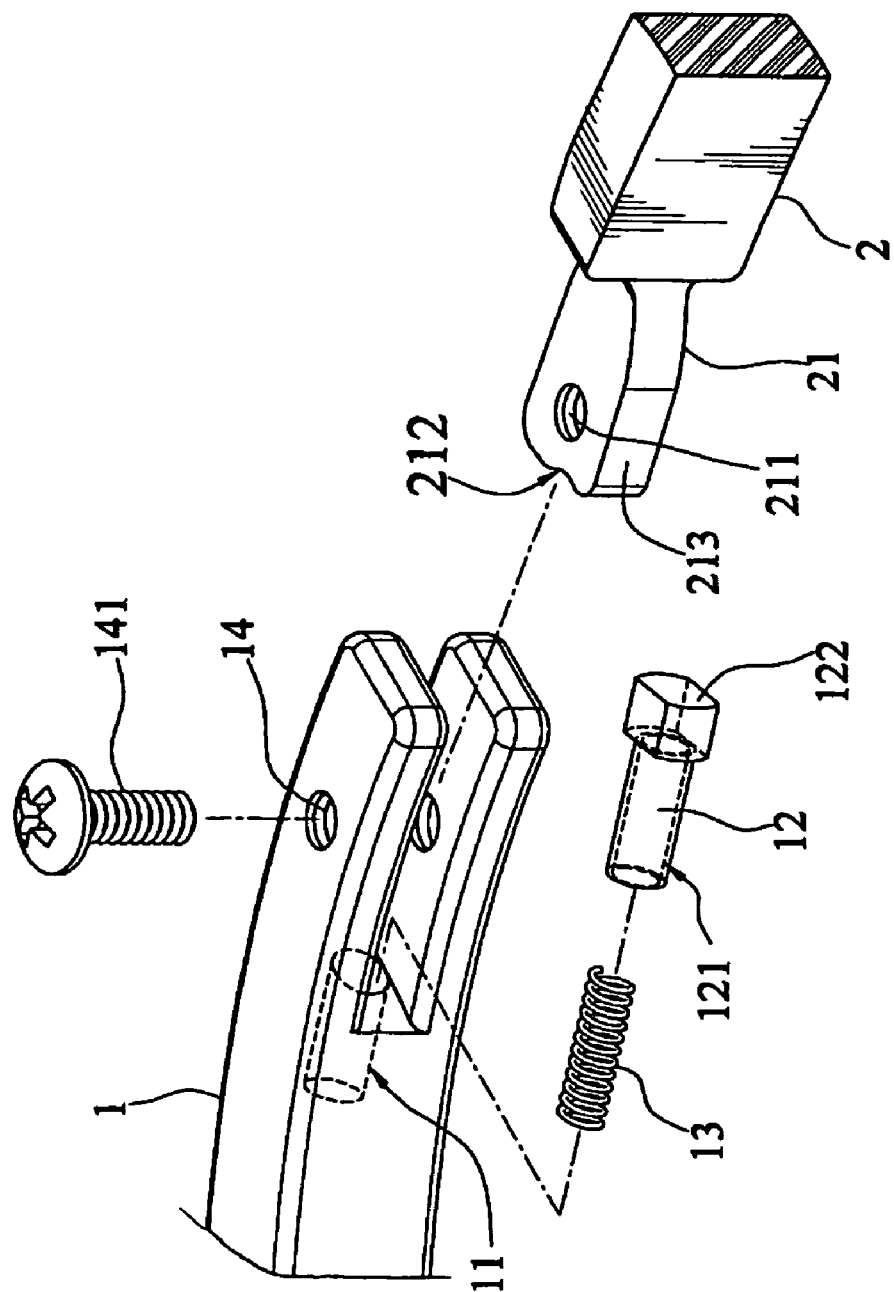
FIG. 2 is a fragmentary exploded perspective view of the present invention.
Figure 3:
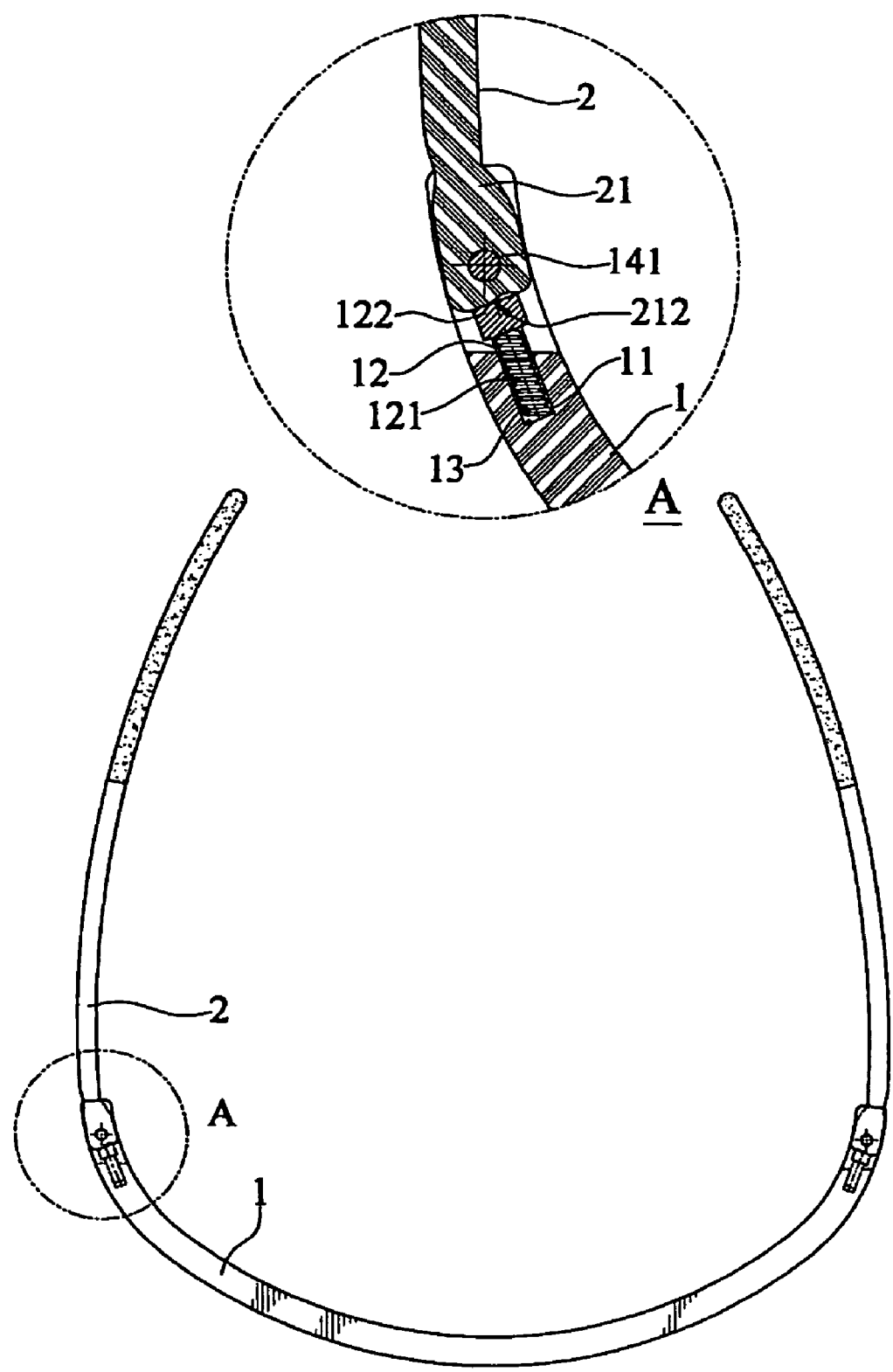
FIG. 3 is a top view and a partial enlarged view of the invention.
Figure 4:
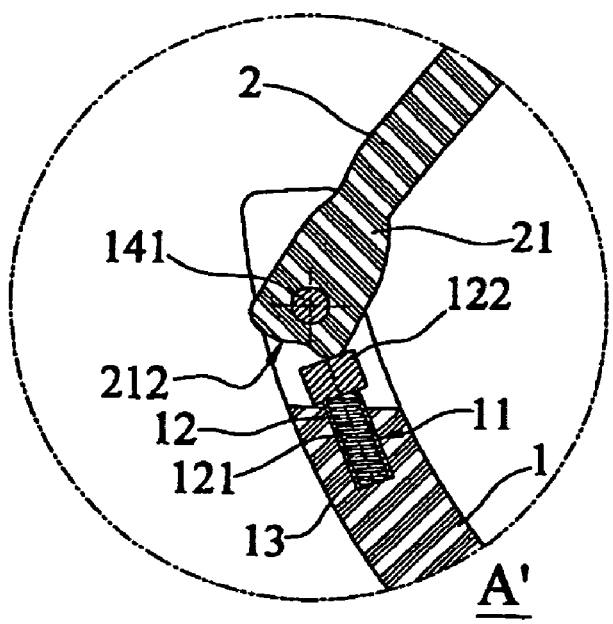
FIG. 4 is a top view and a partial enlarged view of the present invention being moved to not-in-use position.
Figure 4:
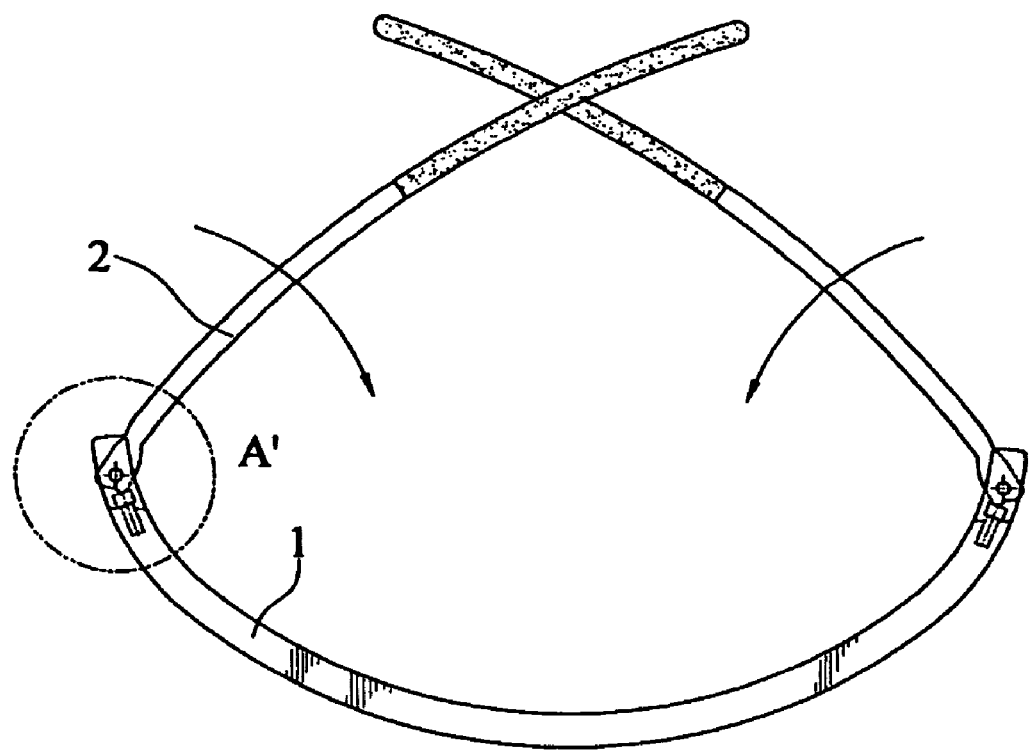

Referring to FIGS. 1 to 3, a preferred embodiment of a pair of eyeglasses of the present invention includes two rims 1, and two temples 2.

Each of the rims 1 has an internal cavity 11, a spring 13 held in the internal cavity 11, a holding element 12 positioned partially in the internal cavity 11 and covering the spring 13, and two opposing pivotal holes 14; the holding element 12 has a holding hole 121 containing the spring 13, and a pressing portion 122 outside the internal cavity 11. Each of the temples 2 has a protruding portion 21 on a front end, which has a connecting hole 211, a locating concavity 212, and a position holding portion 213 thereon. The temples 2 are inserted between the opposing pivotal holes 14 of respective ones of the rims 1 at the protruding portions 21 thereof, and connecting elements 141 are passed through the pivotal holes 14 and the connecting holes 211 of the protruding portions 21 of the temples 2; thus, the holding elements 12 are biased to touch the protruding portions 21 of the temples 2 at the pressing portions 122 thereof by the springs 13, and the temples 2 are pivoted to the rims 1.

Figure 5:
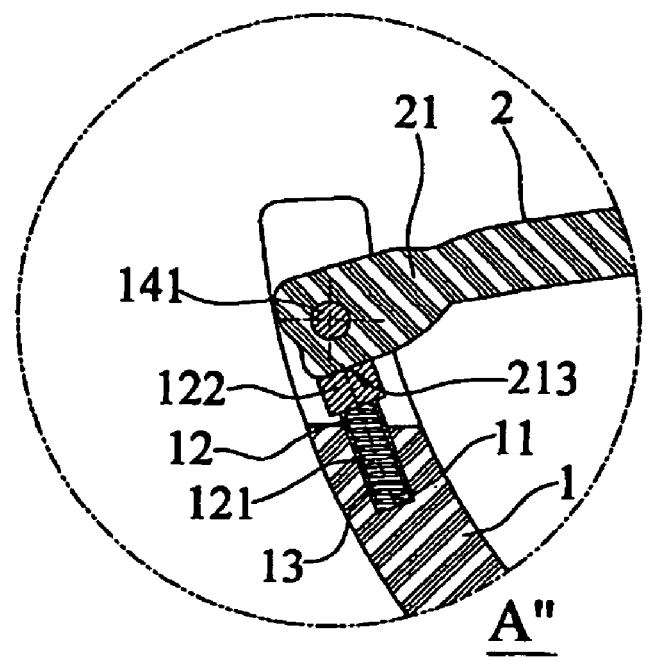
FIG. 5 is a top view and a partial enlarged view of the present invention in the not-in-use position.
Figure 5:
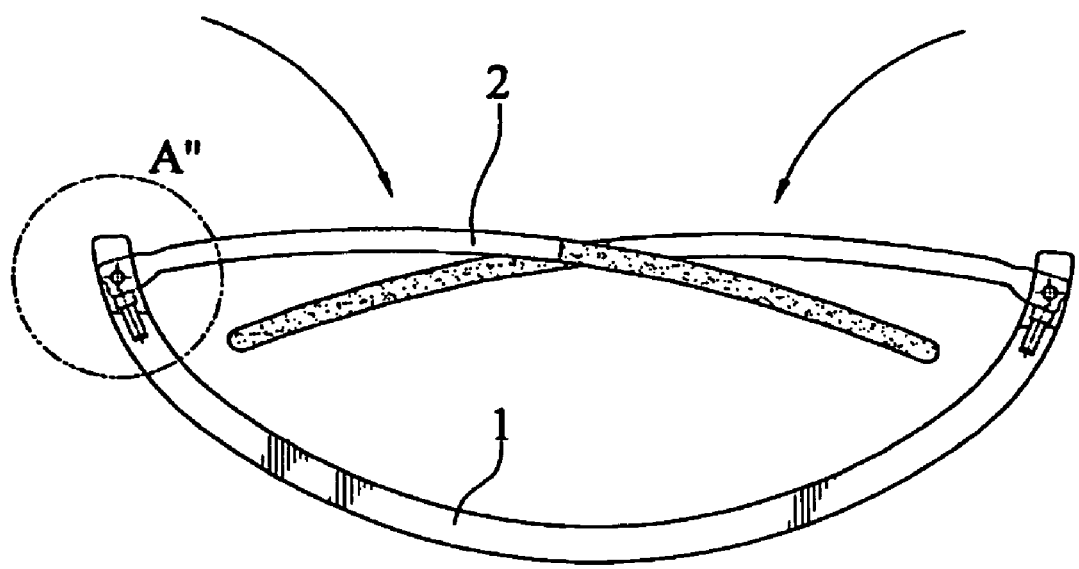

In assembly, referring to FIGS. 2 and 3, the springs 13 are positioned in the holding holes 121 of the holding elements 12, and the holding elements 12 are passed into the internal cavities 11 of the rims 1. Next, the temples 2 are inserted between the opposing pivotal holes 14 of respective rims 1 at the protruding portions 21 thereof such that the temples 2 are in the in-use position, in which position the pressing portions 122 of the holding elements 12 are pressed against the locating concavities 212 of the protruding portions 21 of the temples 2, and the springs 13 are compressed. And, the connecting elements 141 are passed through the pivotal holes 14 and the connecting holes 211 to pivot the temples 2 to the rims 1. Therefore, the temples 2 will be held in position with the pressing portions 122 of the holding elements 12 being pressed against the locating concavities 212 of the protruding portions 21 thereof when they are in the in-use position. And, the temples 2 will be held in position with the pressing portions 122 of the holding elements 12 being pressed against the position holding portions 213 of the protruding portions 21 thereof when they are in the not-in-use position, as shown in FIG. 5. Furthermore, the pressing portions 122 of the holding elements 12 will snap onto the locating concavities 212 in an easily perceptible manner as soon as the temples 2 are pivoted to the in-use position. And, the pressing portions 122 of the holding elements 12 will also snap onto the position holding portions 213 of the protruding portions 21 of the temples 2 in an easily perceptible manner as soon as the temples 2 are pivoted to the not-in-use position.

From the above description, it can be seen that the eyeglasses of the present invention have the following advantages: the temples will be held firmly in position no matter which one of both the in-use and the not-in-use positions they are in, and the eyeglasses will snap in an easily perceptible manner as soon as the temples are pivoted to the in-use position, and as soon as the temples are pivoted to the not-in-use position.

What is claimed is:

1. An improvement on eyeglasses structure, comprising a rim, said rim having an internal cavity, a spring held in said internal cavity, a holding element positioned partially in said internal cavity and covering said spring, and a pivotal hole; said holding element having a holding hole holding said spring; said holding element having a pressing portion; and a temple, said temple having a protruding portion; said protruding portion of said temple having a connecting hole, a locating concavity, and a position holding portion; said temple being pivoted to said rim by means of a connecting element passed through said pivotal hole of said rim and said connecting hole of said protruding portion; said holding element being biased by said spring and pressed against said protruding portion of said temple at said pressing portion thereof; said temple being going to be held in position with said pressing portion of said holding element being pressed against said locating concavity of said protruding portion thereof when it is in an in-use position; said temple being going to be held in position with said pressing portion of said holding element being pressed against said position holding portion of said protruding portion thereof when it is in a not-in-use position; said holding element being going to snap onto said locating concavity as soon as said temple is pivoted to said in-use position; said holding element being going to snap onto said position holding portion of said protruding portion of said temple as soon as said temple is pivoted to said not-in-use position.

* * * * *